E. GINDRE.
CABLE SECURING DEVICE PARTICULARLY APPLICABLE TO THE FIXATION OF ELECTRIC CABLES ON CARBON BRUSHES.
APPLICATION FILED MAY 14, 1921.

1,400,357.  Patented Dec. 13, 1921.

INVENTOR
EUGÈNE GINDRE
BY
ATTORNEYS

UNITED STATES PATENT OFFICE.

EUGÈNE GINDRE, OF LEVALLOIS-PERRET, FRANCE, ASSIGNOR TO SOCIETE ANONYME LE CARBONE, OF LEVALLOIS-PERRET, SEINE, FRANCE.

CABLE SECURING DEVICE PARTICULARLY APPLICABLE TO THE FIXATION OF ELECTRIC CABLES ON CARBON-BRUSHES.

1,400,357. Specification of Letters Patent. Patented Dec. 13, 1921.

Application filed May 14, 1921. Serial No. 469,748.

*To all whom it may concern:*

Be it known that I, EUGÈNE GINDRE, of 12 and 33 Rue de Lorraine, Levallois-Perret, Seine, France, have invented a Cable-Securing Device Particularly Applicable to the Fixation of Electric Cables on Carbon-Brushes, of which the following is a full, clear, and exact description.

This invention has for its object a device for fixing an electric cable on a carbon brush, this device being combined in such a manner as to insure a perfect contact and fixation whatever may be the heating to which the connection may be subjected.

This securing device will be described hereafter with reference to the accompanying drawing which illustrates it on an enlarged scale and in which.

Figure 3:
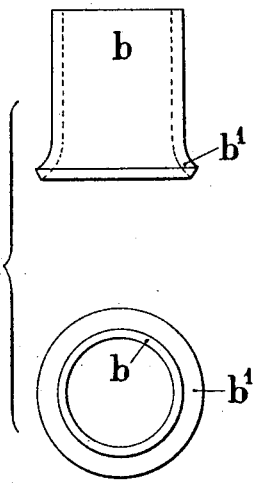
Figs. 3 and 4 are detail views.

As illustrated in the drawing, the electric cable $a$ is provided at its end with a copper socket $b$ flared at one of its ends so as to present a flange $b^1$ (Fig. 3); this socket is secured to the cable by leading, soldering or any other means.

Figure 4:
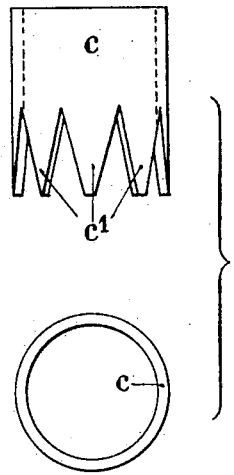

On this socket is fitted another socket $c$ cut away at one of its ends so as to present a number of teeth or points $c^1$ (Fig. 4); the inner diameter of this socket $c$ is equal or very slightly greater than the outer diameter of the body of the socket $b$, but smaller than that of the flared flange $b^1$ of the latter.

Figure 1:
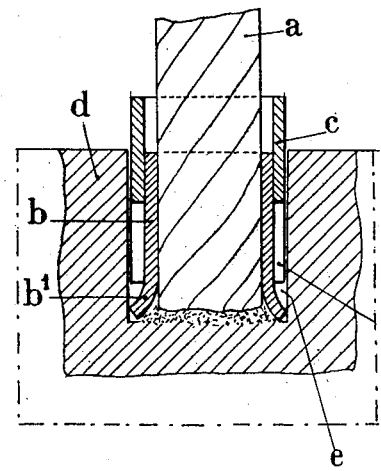
Figure 1 is a section of the securing device as the cable is being mounted in position.

The socket $b$ is mounted on the cable $a$ so that its flange $b^1$ is at the end of this cable and the socket $c$ is fitted on the socket $b$ so that its teeth $c^1$ come in contact with the flange $b^1$ of the socket $b$ (Fig. 1).

In the carbon brush $d$, to which the cable $a$ is to be attached, is provided a hole $e$ the inner diameter of which is equal to the diameter of the periphery of the flange $b^1$ of the socket $b$ and the depth of which is slightly smaller than the height of the socket $c$.

Figure 2:
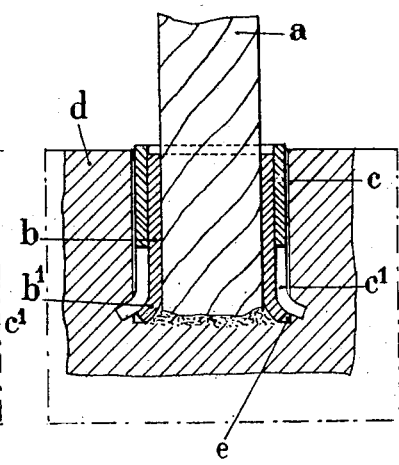
Fig. 2 is also a sectional view showing the cable secured to the carbon brush.

The end of the cable $a$, provided with its socket $b$, on which is fitted the socket $c$, is introduced in the hole $e$ down to the bottom of the latter (Fig. 1); the socket $c$, the teeth of which rest on the flange $b^1$, projects slightly above the plane of the carbon brush $d$. A great pressure is then exerted on the upper edge of the socket $c$; under the effect of this pressure the whole moves down to the bottom of the hole $e$, then when the lower end of the socket $b$ abuts against this bottom of the hole $e$, this flange $b^1$ of the socket $b$ forces the teeth $c^1$ of the socket $c$ to flare and to anchor in the carbon (Fig. 2).

In the device which has just been described, the cable $a$ must project outside the lower part of the socket $b$, so as to form a stuffing or cushion against the bottom of the hole $e$; this precaution entails the forced pressure of the end of the cable on the bottom of the hole and causes the increase of the useful contact surface.

This securing device offers the main following advantages:

1. Electrically, the compact mass, constituted by the end of the cable and the sockets $b$, $c$, anchored into the very midst of the carbon, allows to obtain a connection the loss by contact of which is reduced to the minimum and which is not exposed to be injured either by any oxidation or by the heating of the carbon brush.

2. Mechanically, the manufacture of the present device is of great simplicity and the fixation of the cable is always perfectly insured whatever may be the heating and the jarring to which the connection may be subjected. It is moreover to be noted that the mounting of the cable on the carbon can be effected on any of the faces or sides of the latter, as it is simply necessary to mill a suitable hole in the carbon brush. Moreover the anchoring of the cable which is simply obtained by the ends of the teeth $c^1$ of the socket $c$ cannot in any way comprise the resistance of the carbon brush so much the more as this anchoring is operated in the middle of the carbon brush, that is to say at a point where it has the maximum resistance.

3. The end of the socket $c$, projecting on the outer face of the carbon brush, can be used for fixing, by beading on the said socket, protecting or other members which are made of metal or of insulating material.

It is to be understood that this securing device is capable of receiving various applications and that the form, dimensions and constructional details of the elements constituting this device may be modified according to the applications.

Claim:

A cable securing device particularly applicable to the fixation of electric cables on carbon brushes comprising: a fixed socket mounted at the end of the cable and having at its end a flared rim,—a movable socket fitted on the said fixed socket and terminating by claws so arranged as to come in contact with the flared rim of the fixed socket,— a suitable member to which the cable is to be secured provided with a hole having an inner diameter equal to the diameter of the periphery of the flared rim of the fixed socket and adapted to receive the end of the cable provided with the said fixed and movable sockets, the whole being combined in such a manner that, under the action of a longitudinal pressure exerted on the movable socket, the claws of the latter, sliding on the flared rim of the fixed socket, spread out and anchor in the mass of the member to which the cable is to be secured.

The foregoing specification of my "cable securing device particularly applicable to the fixation of electric cables on carbon brushes" signed by me this 28th day of April, 1921.

EUGÈNE GINDRE.